United States Patent

Medlin, Jr. et al.

[11] Patent Number: 5,263,676
[45] Date of Patent: Nov. 23, 1993

[54] STABILIZED ELECTRICAL MOUNTING BRACKET

[75] Inventors: Lewis B. Medlin, Jr.; Lewis B. Medlin, Sr., both of Blue Ridge, Va.

[73] Assignee: E-Z Mount Bracket Company, Inc., Blue Ridge, Va.

[21] Appl. No.: 909,153

[22] Filed: Jul. 6, 1992

[51] Int. Cl.$^5$ .............................. H02G 3/08
[52] U.S. Cl. .................... 248/300; 248/906; 220/3.6
[58] Field of Search ............. 248/300, 906; 220/3.6, 220/3.9; 52/221

[56] References Cited

U.S. PATENT DOCUMENTS

| | | |
|---|---|---|
| 1,206,431 | 11/1916 | Graybill . |
| 4,135,337 | 1/1979 | Medlin ................. 52/221 |
| 4,569,458 | 2/1986 | Horsley ............... 220/3.6 |
| 4,645,089 | 2/1987 | Horsley ............... 220/3.6 |
| 4,688,693 | 8/1987 | Medlin, Jr. .......... 220/3.9 |
| 4,732,356 | 3/1988 | Medlin, Sr. .......... 248/27.1 |
| 4,964,525 | 10/1990 | Coffee et al. ........ 220/3.9 |
| 4,971,280 | 11/1990 | Rinderer ............. 248/906 |
| 5,004,199 | 4/1991 | Suk .................... 248/300 |
| 5,005,792 | 4/1991 | Rinderer ............. 248/205.1 |
| 5,098,046 | 3/1992 | Webb .................. 248/906 |

OTHER PUBLICATIONS

Erico Products, Inc. leaflet on TH234 Quick Mount Box Support, Copyright 1992.

Primary Examiner—Douglas D. Watts
Assistant Examiner—Hwei-Siu Payer
Attorney, Agent, or Firm—Olive & Olive

[57] ABSTRACT

The invention disclosed provides a mounting bracket configured to attach an electrical outlet box to a wall or ceiling stud in a building construction. The mounting bracket comprises a front panel adapted to retain an outlet box by one or more screws, a parallel and forwardly offset mounting flange adapted to be securely fastened to the front surface of a wall or ceiling stud, a perpendicular step connecting the front plate and the mounting flange and a buttress attached to a top or bottom edge or both edges of the front panel in perpendicular relation thereto and with the step and buttress being positioned to abut a side surface of the wall or ceiling stud. Alternative embodiments illustrate various forms of the front panel, buttresses and other stiffening structure.

15 Claims, 5 Drawing Sheets

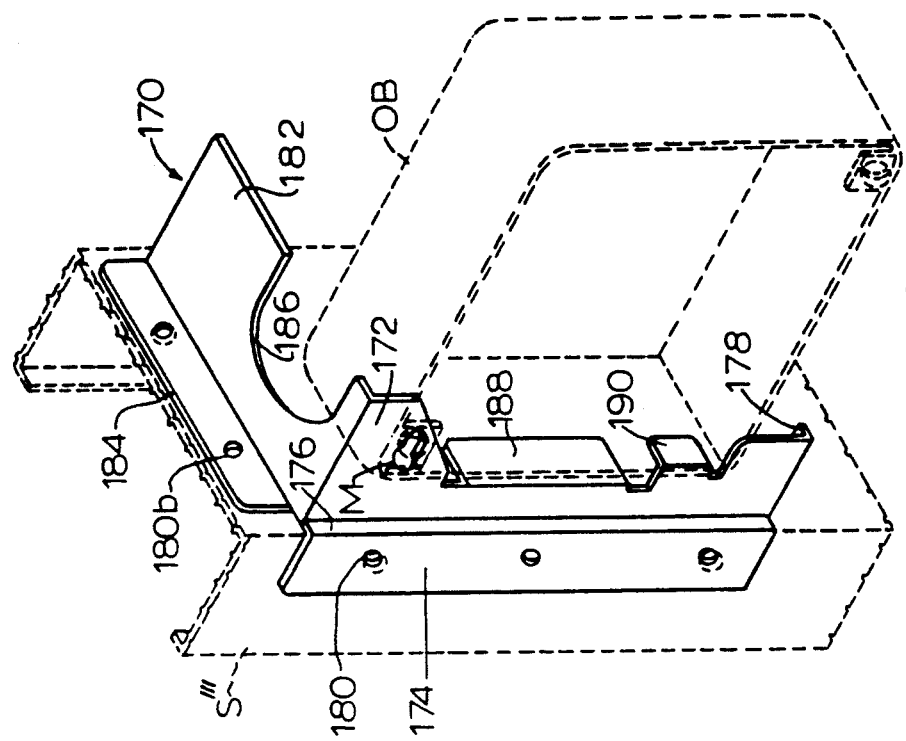
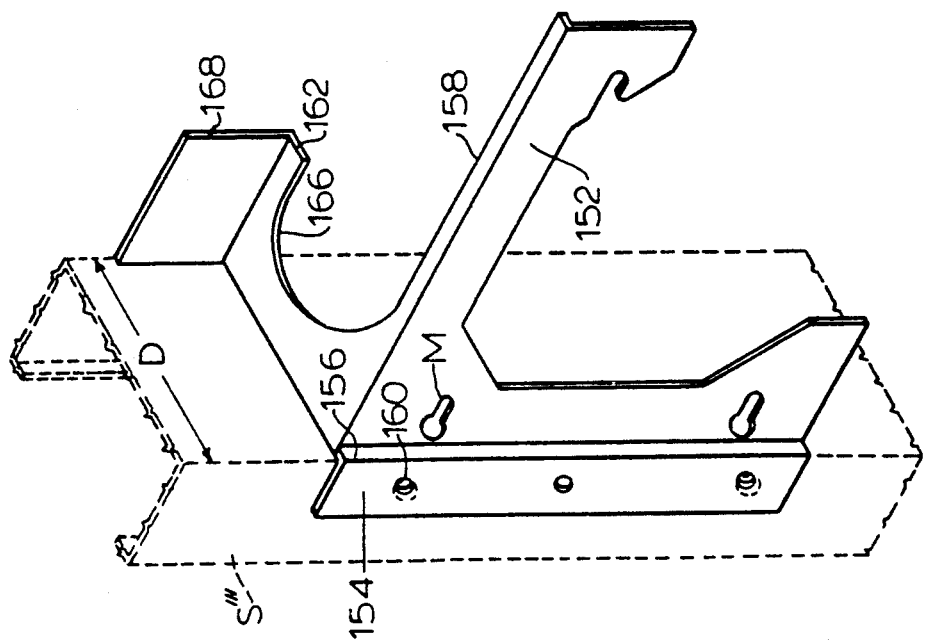

STABILIZED ELECTRICAL MOUNTING BRACKET

FIELD OF THE INVENTION

The present invention relates to brackets for mounting of electrical equipment, and more specifically for mounting on a wall or ceiling stud during building construction or repair, an electrical outlet box, a junction box, any similar box or combinations thereof used in the electrical trade in which electrical connections are made (hereinafter collectively referred to as an "outlet box").

BACKGROUND OF THE INVENTION

A common procedure in the construction industry for installing electrical outlet boxes involves the use of a mounting bracket attached to a wall stud and adapted to receive and hold the outlet box. This practice is particularly applicable to the portion of the industry involved with commercial, large scale construction. The mounting brackets are made in a large assortment of styles and are useful in conjunction with both wooden and metal construction studs. Such mounting brackets are typically attached to the supporting studs by means of screws.

In the interest of saving material and labor, earlier versions of the mounting brackets were attached to a stud on one end of the bracket but were not supported on the other end of the bracket. It was found in use that a mounting bracket supported on only one end does not adequately resist a force tending to push the outlet box back into the space behind the face wall (the dry wall through which the open side of the outlet box is accessible), thus resulting in the mounted outlet box not being parallel to the face wall, which is an unacceptable condition.

An early attempt to stabilize an outlet box is shown in U.S. Pat. No. 4,135,337 to Medlin in which an integral bracket support was secured to the stud and the outlet box abutted a portion of the bracket. While this construction eliminated the need for a stabilizing extension, the method of stabilizing the bracket by passing screws through the dry wall as mentioned in Column 5, lines 5-6 of the patent, was found to be costly and labor intensive. In another illustration of a prior stabilizing practice, U.S. Pat. No. 4,533,060 to Medlin in Column 7, lines 25-27 refers to attaching an outlet box bracket to the back of a dry wall.

A later version of the mounting bracket has included means for stabilizing the bracket in relation to the face wall by providing a rearward projecting leg or extension adapted to contact a back dry wall and stabilize the end of the bracket opposite the end attached to the stud. A mounting bracket of the type having an extension is taught in U.S. Pat. No. 4,399,922 to Horsley for mounting a single outlet box and in U.S. Pat. 4,572,391 to Medlin for mounting a pair of electrical outlet boxes. While the leg or extension such as shown in the referred to Horsley and Medlin patents have assisted in stabilizing the bracket, use of the described leg or extension requires the presence of a back wall parallel to the face wall. In the absence of a back wall, the leg or extension serves no purpose and the bracket is generally unstable. In an unfinished, partially occupied office building, for example, the back walls are often not present. Additionally, as illustrated in U.S. Pat. No. 4,732,356 to Medlin, an extension leg requires adjustment of its length according to the wall spacing. Also, the above mentioned brackets do not provide adequate support for outlet boxes installed in a ceiling.

It is also to be recognized that while the mounting flange has been offset from the front panel of an electrical outlet box mounting bracket as illustrated, for example, in U.S. Pat. No. 4,688,693 to Medlin, the primary purpose of this offset has been to enable the dry wall ring to be recessed sufficiently to avoid bulging of the dry wall in front of the bracket. The step providing this offset has generally been formed at an angle rather in a perpendicular relation because of the purpose of the offset.

In another aspect of the prior art, U.S. Pat. No. 4,964,525 to Coffey et al. illustrates an electrical outlet box mounting bracket having a step which offsets the stud mounting flange from the front panel of the bracket. While shown in the patent with the step positioned against a side surface of a stud, the patent in Column 2, lines 60-63, describes this type of bracket as depending for its stability on the presence of a pair of extension legs engaging a back wall. Thus, this type of bracket further illustrates dependency on the presence of a back wall for stabilizing the bracket which dependency has been eliminated by the present invention. Moreover, the type bracket described in the '525 patent does not lend itself to being installed in a ceiling.

A further aspect of the prior art recognizes the recent introduction by Erico Products, Inc. of what is referred to as the TH234 Quick Mount Box Support. This product is an electrical outlet box mounting bracket having a box stop and box hook adapted to rest on opposite sides of one side of an outlet box and a partial front plate which mounts the outlet box with only one mounting screw. The bracket, however, has an extension which does not contact or rest against the stud and which depends on the presence of a back wall for stability and lacks means independent of the extension for stabilizing the bracket.

In the practice of installing electrical outlet box mounting brackets, it is generally desirable to install the bracket such that it is "square" relative to the stud meaning that the bracket assumes a perpendicular relation relative to the stud. The conventional bracket does not depend for its stability on the bracket being installed in such a square relation. Thus, the bracket is frequently improperly installed on the job. In contrast, the bracket of the present invention does require that the bracket, in order to be stabilized, assume a square relation relative to the stud and thus meets a long-felt need in the industry.

A further practical consideration on the job is that electrical outlet box mounting brackets having extensions are frequently "lost" as to location once installed because the extensions get bent which permit the bracket to be bent and inadvertently covered over by the dry wall mechanic who fails to cut out an outlet box hole in the dry wall. This is particularly a problem when the bracket or the extension gets bent and there is no back wall. The bracket of the present invention, in contrast, cannot be lost in this manner since it cannot be properly installed except in a manner that insures it will not be lost.

Therefore, a general object of the present invention is to provide an outlet box mounting bracket capable of holding an outlet box in a more secure and stabilized manner with or without the presence of a dry wall on the backside of the stud.

An additional and more specific object of the invention is to provide an outlet box mounting bracket which, does not require use of an extension leg or the like and does not depend for its stability on the presence of a back dry wall opposite the face wall adjacent which the bracket is mounted.

Another object of the invention is to provide an outlet box mounting bracket which can be stabilized on either a wooden or metallic wall stud.

A further object is to provide an outlet box mounting bracket which can be stabilized on a stud whether the stud forms part of a wall or a ceiling construction.

A further object is to provide an electrical outlet box mounting bracket constructed such that if inadvertently covered over by a dry wall mechanic, will inherently reveal its location and thus will not be lost as are prior art brackets in the manner explained above.

These and additional objects will become apparent through the disclosure of the invention and disclosure of the several embodiments to follow.

SUMMARY

The present invention provides an improvement in brackets employed for mounting electrical outlet boxes on a wall or ceiling stud in a construction wall or ceiling and is exemplified by a number of specific embodiments. A mounting flange on one end of the mounting bracket of the invention is attached to the front face or face surface of the wall or ceiling stud and fastener holes are provided to facilitate this attachment. In the generic form and in each of the specific embodiments, a step and a buttress are formed perpendicular to a front plate which attaches, through the mounting flange, to the front of a wall or ceiling stud and are adapted to bear against a side surface perpendicular and adjacent to the front or face surface of the stud. The described mounting bracket side bearing portion permits any force applied to push the bracket rearwardly from its initial position to be counteracted by the step and buttress contacting the side of the stud. When installed in a ceiling, the mounting flange is typically secured to the bottom surface of a horizontal stud and the bracket of the invention equipped with flanges that are secured also counteracts any force tending to pull the bracket downwardly from the ceiling. Various embodiments comprising combinations of steps and buttresses with buttress flanges and stiffening lips are described.

BRIEF DESCRIPTION OF THE DRAWINGS

FIG. 8 is a perspective view of an eighth embodiment of the outlet box mounting bracket of the invention illustrated as being designed for mounting a 4 inch outlet box and shown secured to the front surface of a metal stud, indicated in dashed lines, and having a front plate formed with only one vertical side and an upper side with a stiffening lip and having a single extended buttress with a buttress stiffener.

FIG. 9 is a perspective view of a ninth embodiment of the outlet box mounting bracket of the invention of a type designed to mount either a 4 inch or 4 11/16 inch outlet box and shown secured to a metal stud, indicated in dashed lines, and which may be part of a wall or ceiling construction and having only a single vertical side and a single extended buttress which is cut out for cables or a conduit and a single buttress flange with attaching holes and further having a box stop and box hook with an outlet box, shown in dashed lines, secured thereto.

DESCRIPTION OF THE INVENTION

The mounting bracket of the invention as illustrated in the various embodiments to be described is primarily directed to providing an electrical outlet box mounting bracket which can be stabilized without the need for an extension leg, is braced and stiffened solely by attachment to and bearing against the stud and easily adapts to walls with different wall spacing and also to ceilings. The invention bracket also adapts to any type metal or wall or ceiling stud or similar construction member having front and side surfaces in perpendicular relation. The term "stud" in reference to the drawings and description is used in this context.

Figure 1:
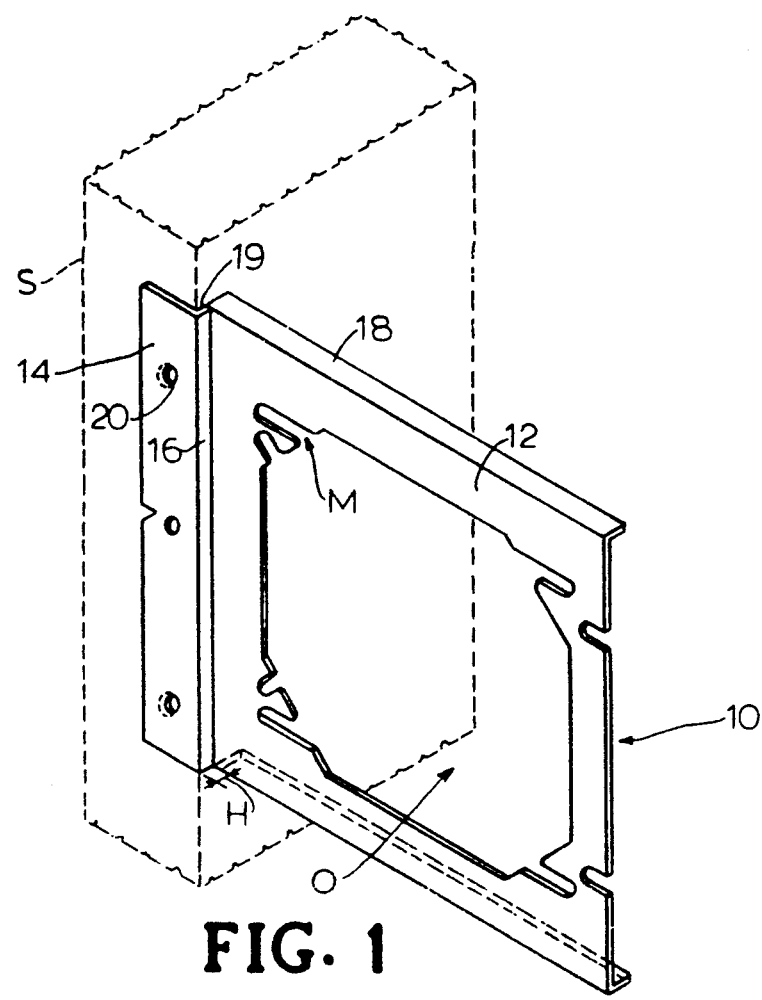
FIG. 1 is a perspective view of a first embodiment of the outlet box mounting bracket of the invention of a type designed to mount either a 4 inch or 4 11/16 inch outlet box and having a stiffening lip perpendicular to the face of the bracket at each of the top and bottom edges of the bracket and shown secured to a wooden wall stud, shown in dashed lines.

With the foregoing in mind, reference is made to FIG. 1 illustrating a first embodiment of the invention. Bracket 10 is a substantially rectangular structure formed from a single, thin but rigid integral sheet and having a front panel 12 formed with an opening 0 adapted in both shape and size to register with the open side of an outlet box OB of comparable size and shape (FIG. 1A) approximately in the center of front panel 12. Opening 0, in this and other embodiments is configured to register with the open side of a standard outlet box of selected size and is surrounded by a plurality of apertures M adapted to receive mounting screws for securing the outlet box to the bracket. Apertures M may be round holes, elongated slots, "keyhole" slots, or the like, such as illustrated, for example, in prior U.S. Pat. Nos. 4,399,922; 4,572,391; 4,688,693; 4,753,361 and 4,757,908 the teachings of which are incorporated herein by reference. Panel 12 is parallel to and offset from mounting flange 14 which is adapted to be fixedly attached to a stud of a building by means of screws T (FIG. 1A) or other fastener means mounted in screw holes 20. Front panel 12 and mounting flange 14 are connected by step 16 which is essentially perpendicular to each of the parallel outer surfaces of front panel 12 and mounting flange 14 and which contacts and rests against a side surface of the stud. A rearwardly bent pair of stiffening lips 18 are formed perpendicular to the outer surface of and at an upper and a lower edge of the front panel 12. Of particular significance to the invention, stiffening lips 18 are arranged such that their inner edges 21 (FIG. 1A) engage the side surface of the supporting stud S and are coplanar with and form a continuation of the inner surface 19 (FIG. 1) of step 16. In this manner, lips 18 in conjunction with step 16 form a rigid, stiffening structure for bracket 10 thus eliminating the need for an extension leg as in the prior art type bracket and enabling bracket 10 to be operable independent of the wall spacing.

Figure 1A:
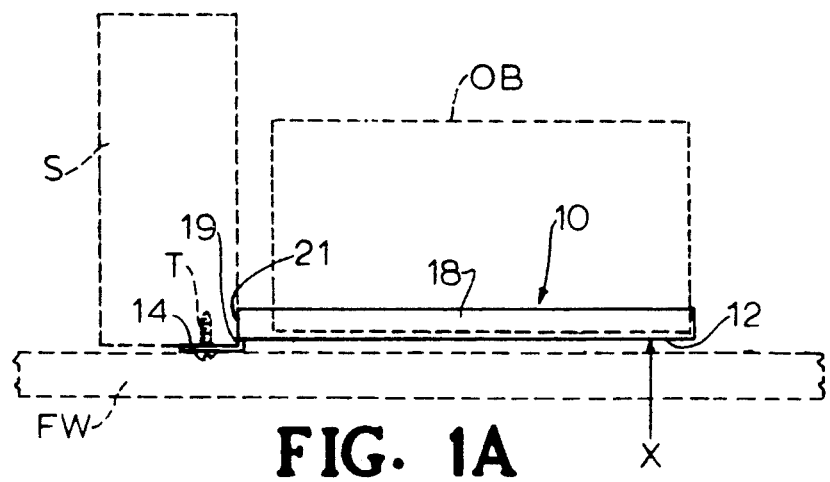
FIG. 1A is a top plan view of the mounting bracket of FIG. 1 assembled to the front surface of the wall stud, shown in dashed lines, and located adjacent to a face wall and having an outlet box, shown in dashed lines, mounted thereon.

A further illustration of this stiffening feature of the invention, as manifest in this first embodiment, is shown in FIG. 1A as a top plan view. Mounting bracket 10 is shown having its offset mounting flange 14 attached to the front surface of wall stud S (shown in dashed lines) by screws T and held against the corner of stud S. In this position step 16 and the stud bearing edges 19 of stiffening lips 18 each engage and bear against a side of stud S. Each stiffening lip 18 extends along the full length of the front panel 12 to achieve maximum rigidity thereof. Outlet box OB, in dashed lines, is shown mounted on mounting bracket 10 but with the box mounting screws, dry wall ring and the like being eliminated to simplify the illustration. A typical dry wall face FW, shown in dashed lines, is shown attached to the front surface of stud S and located in front of outlet box OB.

It can thus be seen that when a rearwardly directed force such as that represented by arrow X presses against front panel 12, any tendency toward movement of mounting bracket 10 is counteracted by the stiffening force provided by the step 16 and inner edges 19 of lips 18 pressing against the side surface of stud S.

Figure 2:
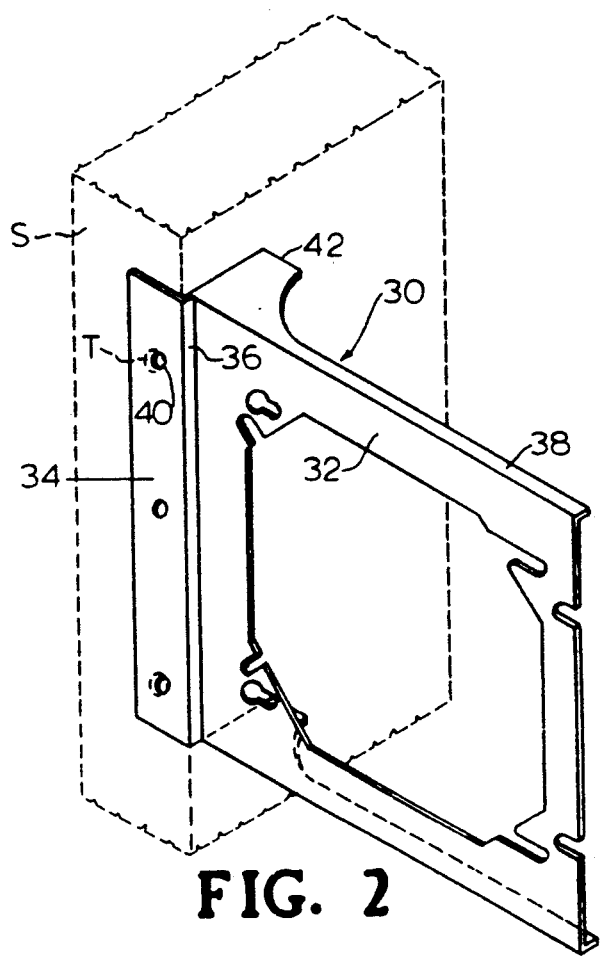
FIG. 2 is a perspective view of a second embodiment of the outlet box mounting bracket of the invention of a type designed to mount either a 4 inch or 4 11/16 inch outlet box and shown secured to the front surface of a wooden wall stud, indicated in dashed lines, and having both a stiffening lip and buttress at the top and bottom of the bracket.

Whereas mounting bracket 10 of FIGS. 1, 1A represents the basic principle of buttressing against movement and of edge stiffening of the invention mounting bracket, several further embodiments contain these and additional detail features, thus adding to the overall utility and versatility of the invention. FIG. 2 illustrates a mounting bracket 30 having a front panel 32, an offset mounting flange 34 with screw holes 40, screws T, a connecting step 36, and a pair of stiffening lips 38. In addition, mounting bracket 30 has a pair of rearwardly extending buttresses 42 which are operative to increase the effectiveness of the reinforcement provided by stiffening lips 38. Each buttress 42 is connected to a respective stiffening lip 38 with a gradual curve to optimize the support strength provided. It will be understood that the inner surface of step 36 and inner edges of buttresses 42 which engage the side surface of stud S are coplanar and serve to stiffen the bracket 30 as previously explained.

Figure 3:
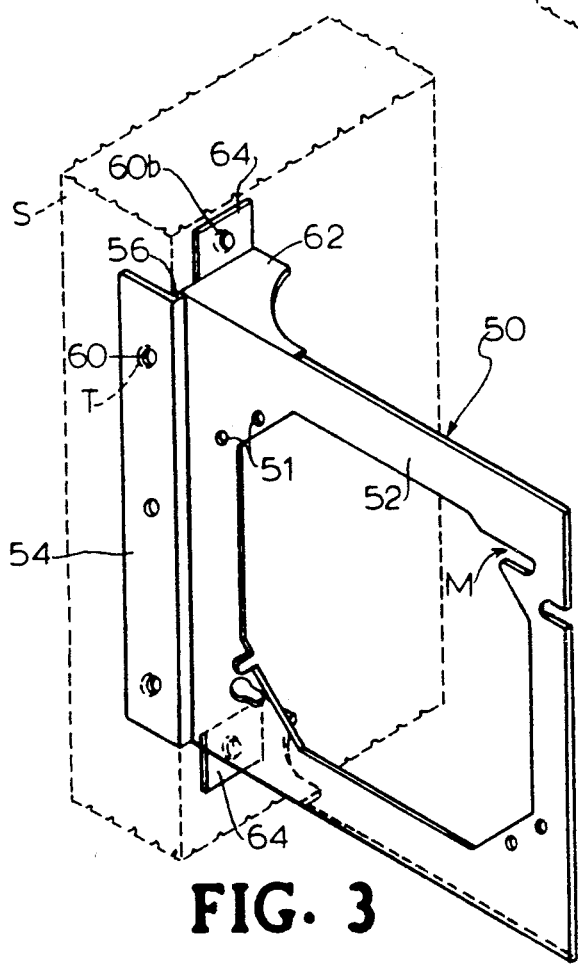
FIG. 3 is a perspective view of a third embodiment of the outlet box mounting bracket of the invention of a type designed to mount either a 4 inch or 4 11/16 inch outlet box or their dry wall ring only and shown secured to the front surface of a wooden stud, indicated in dashed lines, of construction similar to the second embodiment construction but with an added buttress flange formed such that it can be attached to a stud whether forming part of a wall or ceiling construction.

FIG. 3 illustrates a further modification in an additional embodiment of the invention. In this form of the invention, mounting bracket 50 has a front plate 52, a mounting flange 54 with screw holes 60 for receiving screws, a connecting step 56, buttresses 62 and buttress flanges 64 extending perpendicularly above and below respective upper and lower buttresses 62 so as to be in full contact with the side surface of stud S. Starter holes 51 permit attachment of the dry wall ring only for low voltage applications in which an outlet box is not necessary. Each buttress flange 64 has a screw hole 60b adapted to be optionally secured by means of a screw or other fastener to stud S. The buttress flanges 64 are particularly useful when bracket 50 is mounted on a ceiling stud. The addition of buttress flanges 64 and fasteners in screw holes 60b add further strength and stability to this embodiment. The inner surfaces of the buttresses 62, flanges 64 and connecting step 56 are coplanar and thus provide an extremely rigid support for bracket 50.

Figure 4:
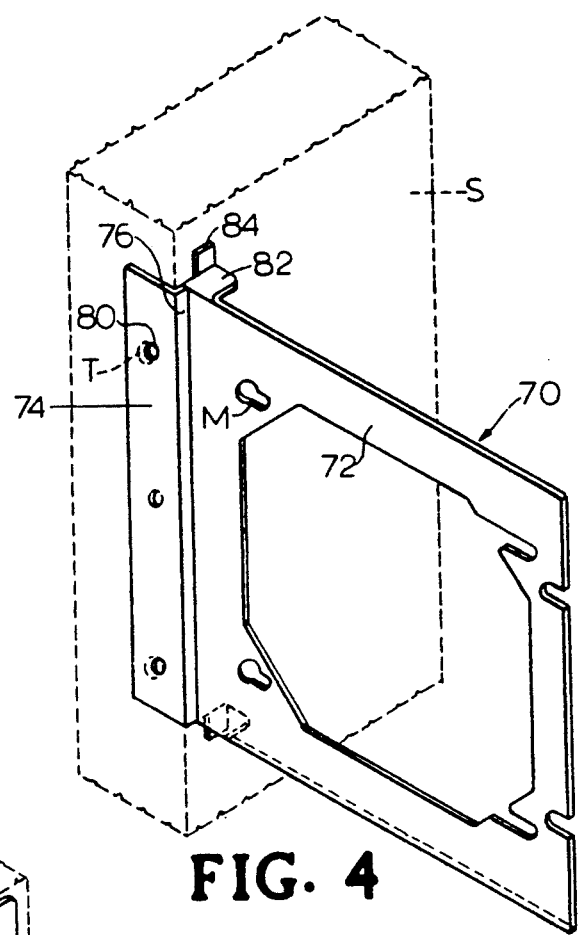
FIG. 4 is a perspective view of a fourth embodiment of the outlet box mounting bracket of the invention of a type designed to mount either a 4 inch or 4 11/16 inch outlet box and formed without stiffening lips but with a buttress and non-attachable buttress flange at the top and bottom of the bracket.

FIG. 4 shows an additional variation upon the basic principle of the invention with a mounting bracket 70. In this embodiment, intended for somewhat lighter service than the previously described embodiments, mounting bracket 70 has no stiffening lip. Mounting flange 74 formed with holes 80 receives screws T. Flange 94 is formed with screw holes 100. Buttresses 82 connect directly behind front plate 72 and effectively serve as a continuing segment of step 76 so as to prevent bracket 70 from being bent rearwardly behind a face wall. Each buttress flange 84 is formed perpendicular to the outer end of a respective buttress 82 but in this simplified version, has no screw holes. In this simplified variation, the inherent stiffness of the outlet box is heavily relied upon to prevent the front plate 72 from being flexed rearwardly in conjunction with the stiffening effect provided by the coplanar buttress 82 edges, flanges 84 and step 76.

Figure 5:
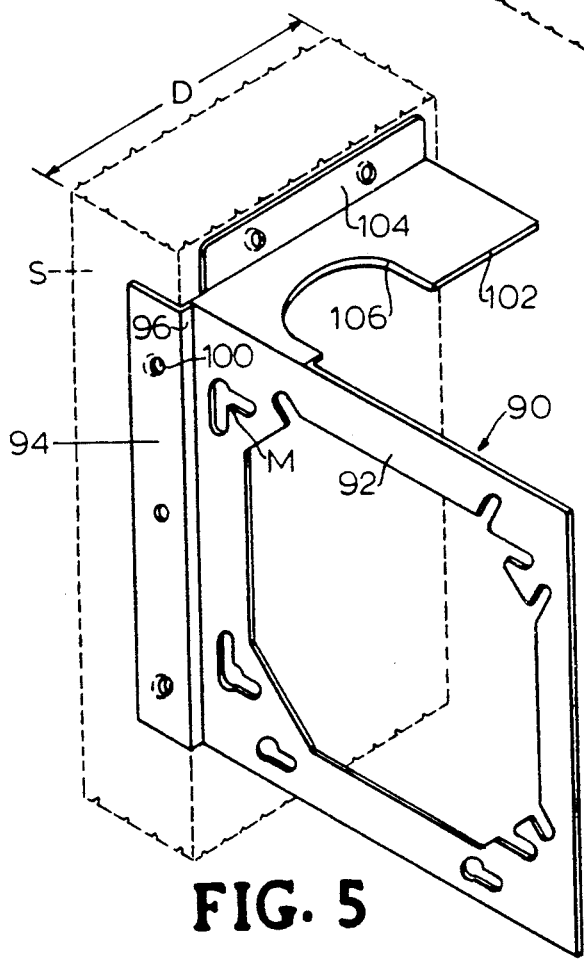
FIG. 5 is a perspective view of a fifth embodiment of the outlet box mounting bracket of the invention of a type designed to mount either a 4 inch or 4 11/16 inch outlet box either of which can be rotated 90° and having no stiffening lips but with a single extended buttress cut out for cable or conduit attachment and a single attachable buttress flange and shown attached to a wooden stud, shown in dashed lines and which may form part of a wall or ceiling construction.

FIG. 5 portrays a fifth embodiment of the invention as mounting bracket 90. Front plate 92 is connected to parallel mounting flange 94 with step 96. Mounting flange 74 formed with holes 80 receives screws T. Flange 94 is formed with screw holes 100. Adjacent to the connection point of step 96 to face 92 is a single buttress 102 which is of a size, as measured in a direction perpendicular to and rearwardly from the face of front plate 92, that is approximately equal to the depth dimension D of stud S. An opening 106, adapted to allow the passing of a cable or conduit, is cut into buttress 102. A buttress flange 104 is perpendicularly formed at the upper surface of buttress 102. No stiffening lip is used, in reliance on the stiffness of the outlet box to be mounted in conjunction with the stiffening effect of the buttress flanges 104, buttress 102 and step 96. As in the case of bracket 50 of FIG. 3, the buttress flanges 104 are particularly useful when bracket 90 is mounted on a ceiling stud.

Figure 6:
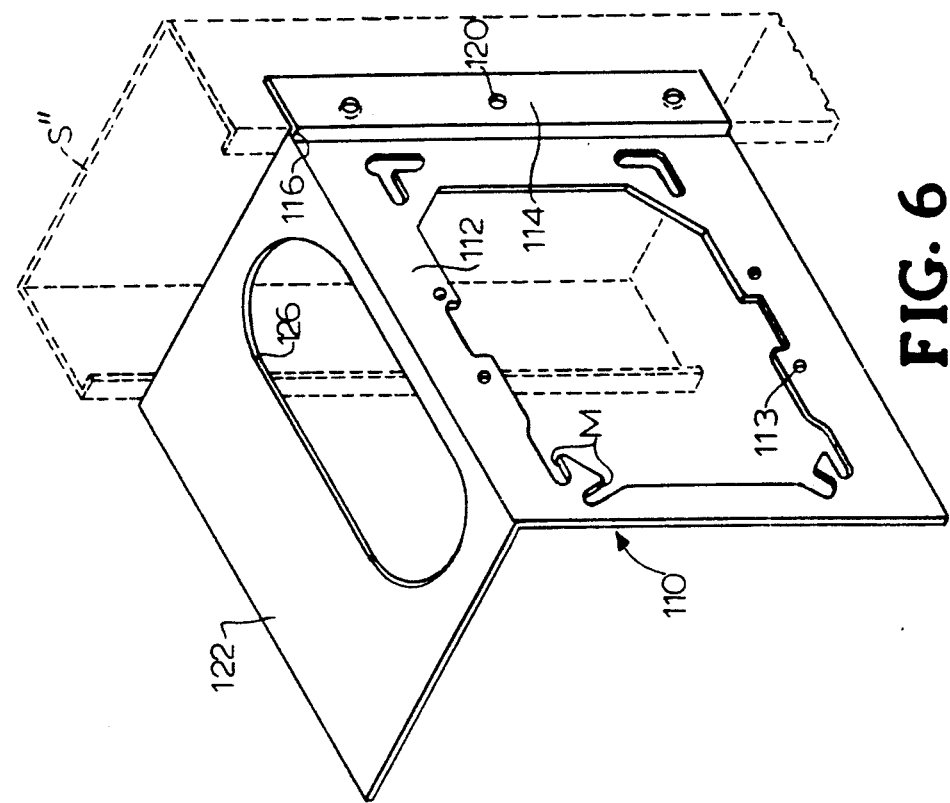
FIG. 6 is a perspective view of a sixth embodiment of the outlet box mounting bracket of the invention of a type designed to mount either a 4 inch or 4 11/16 inch outlet box or a switch box and shown secured to a metal stud, indicated in dashed lines, and having a single, unattached extended buttress cut out for cable or conduit attachment.

A further embodiment incorporating the features of several of the previously described embodiments is shown in FIG. 6. Mounting bracket 110 formed with mounting flange 114 is shown assembled to the front surface of a metal stud S" by fasteners T, not shown, passed through screw holes 120 with step 116 snugly pressed against the corner of stud S". Front plate 112 is formed perpendicular to step 116 and to extended buttress 122 and has a cable or conduit opening 126. Buttress 122 is made sufficiently wide to span the open side of metal stud S" and afford substantial resistance to flexing of front plate 112. Starter holes 113 permit attachment of a switch box to bracket 110.

Figure 7:
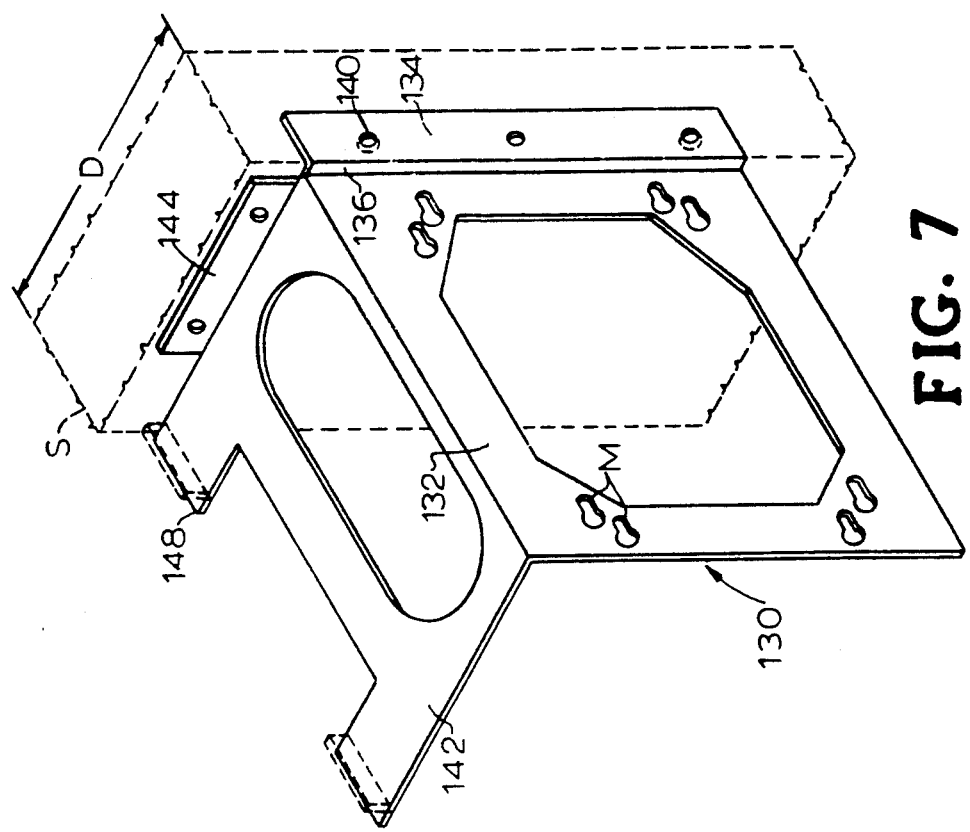
FIG. 7 is a perspective view of a seventh embodiment of the outlet box mounting bracket of the invention of a type designed to mount either a 4 inch or 4 11/16 inch outlet box and shown secured to a wooden stud, indicated in dashed lines, which may be part of a wall or ceiling construction and having a single extended buttress with a pair of length adjustable legs illustrated bent in dashed lines, a cut out for cable or conduit and an attachable buttress flange.

Making reference next to FIG. 7, mounting bracket 130 is similar to mounting bracket 110 of FIG. 6 with the addition of buttress flange 144 and legs 148. Buttress flange 144 is formed perpendicular to and directed upwardly from the rear edge of buttress 142. Legs 148 are formed as a continuation of the structure of buttress 142 and are adapted to contact a rear wall parallel to the face wall. Legs 148 are further adapted to be bent by the installer in case legs 148 are longer than the depth D of stud S and would otherwise interfere with a wall parallel to the face wall used. This variable length leg 148 (shown bent in dashed lines) affords an additional support of the position of front plate 132 by contacting a second wall parallel to the face wall and adjacent the rear side of the stud. Bracket 130 is secured to stud S by screws passed through screw holes 140 in mounting flange 134 and is rigidly supported by the step 136, buttress 142, buttress flange 144 and legs 148. As in the case of bracket 50 of FIG. 3 and bracket 90 of FIG. 5, the buttress flanges 144 are particularly useful when bracket 130 is mounted on a ceiling stud.

FIG. 8 displays an eighth embodiment of the invention having a partial front plate 152 with three, rather than four, corners. Front plate 152 is connected to mounting flange 154 by perpendicular step 156 and has a plurality of mounting holes M. Flange 154 is formed with screw holes 160. Perpendicularly connected to the upper edge of front plate 152 is stiffening lip 158 which joins buttress 162 which is substantially of equal dimension to the depth D of the illustrative metal stud S'''. Buttress 162 has opening 166 adapted to pass cables or conduit and further has an upwardly projecting buttress stiffener 168 at its outer extremity. In use, the inner edges of stiffener 168 and buttress 162 and inner surface of step 156, which abuts the stud S''', are coplanar and thus rigidly resist any force which tends to force the bracket backward.

In a ninth embodiment, illustrated in FIG. 9, mounting bracket 170 comprises a mounting flange 174 with screw holes 180 and a shortened front plate 172 which is of substantially equal length to the length of buttress 182. Buttress 182 has opening 186 and buttress flange 184 with screw holes 180b. A flat or planar box stop 188 is positioned in a plane parallel to step 176 so as to contact the outer side of an outlet box OB (shown in dashed lines) secured in mounting bracket 170. Beneath box stop 188, and farther from the plane of step 176 than box stop 188 is a flat or planar box hook 190 which is located and adapted so as to reside within a lower corner of an outlet box OB mounted thereon. By the combination of single screw slot M, box hook 190 and box stop 188, an outlet box OB is securely held. The lower portion of face 172 has a stiffening lip 178. As previously explained in reference to FIGS. 3, 5 and 7, buttress flanges 184 are particularly useful when bracket 170 is mounted on a ceiling stud.

The material of which the disclosed embodiments are made is typically a single sheet of stamped, galvanized sheet steel, though another stiff sheet material may be employed.

It is to be understood that, while the description refers to the position of certain parts in relation to other parts, this refers to the illustrated relationships. In use, the mounting brackets of the invention are capable of being mounted in various orientations according to the surrounding construction and choice of the installer. Also to be understood is that while showing only one outlet box supported by the illustrated bracket in each drawing, it is recognized that the invention bracket could be modified to support plural outlet boxes of the same or different size.

In all embodiments, the dimension H (FIG. 1) representing the width of the step such as step 16 shown in FIG. 1, is approximately 3/16 inch. The dimension is generally sufficient to provide the desired stabilizing effect when the step rests against a side surface of the stud and also recesses the dry wall ring sufficiently to prevent bulging of the dry wall.

The embodiments illustrated and described herein depict a few of the numerous adaptations possible under the fundamental principles of the invention. Additional variations as will be apparent to those skilled in the art are considered to be within the overall scope of the invention.

What is claimed is:

1. An integrally-formed electrical outlet box mounting bracket adapted for supporting at least one size electrical outlet box on a wall or ceiling stud having perpendicularly oriented face and side surfaces, comprising:
(a) a substantially planar front wall occupying a first plane and having at least one substantially rectangular central opening of a size and shape corresponding to the size and shape of the open side of an outlet box to be mounted thereon and having screw attachment apertures surrounding said central opening for receiving mounting screws associated with said box;
(b) a substantially planar connecting wall occupying a second plane perpendicular to said first plane and integrally connected to said front wall along a first edge of said connecting wall;
(c) a substantially planar mounting flange occupying a third plane offset outwardly from and substantially parallel to said first plane and integrally connected to said connecting wall along a second edge thereof located opposite said first edge, said mounting flange being adapted for being secured to the face surface of a stud so that said first and third planes reside in planes substantially parallel to said face surface of said stud and an inner surface of said connecting wall is caused to contact and rest snugly against a side surface of the stud; and
(d) stiffening means including at least one stiffening member integrally formed as part of said bracket, extending inwardly from said front wall and having a surface coplanar with said connecting wall inner surface which contacts and rests against the same side surface of the stud against which said connecting wall inner surface rests when said mounting flange is secured to said stud and operative to resist movement of said front wall away from said first plane.

2. An electrical outlet box mounting bracket as claimed in claim 1 in which said connecting wall comprises a step formed as a planar rectangular portion of said bracket and in which said first edge is substantially parallel to said second edge.

3. An electrical outlet box mounting bracket for an electrical outlet box as claimed in claim 2 in which said stiffening member comprises at least one planar buttress oriented in a plane substantially perpendicular to both said first and second planes.

4. An electrical outlet box mounting bracket as claimed in claim 3 in which said front wall includes at least one stiffening lip in a plane perpendicular to the plane of said front wall.

5. An electrical outlet box mounting bracket as claimed in claim 1 in which said front wall includes at least one stiffening lip in a plane perpendicular to the plane of said front wall.

6. An electrical outlet box mounting bracket as claimed in claim 5 in which said stiffening lip has an end edge surface substantially coplanar with said connecting wall inner surface which contacts and rests against the same side surface of the stud against which said connecting wall inner surface rests.

7. An electrical outlet box mounting bracket as claimed in claim 1 in which said stiffening member includes at least one planar flange adapted to contact and rest against the same stud side surface against which said connecting wall inner surface and said stiffening member surface rests when said mounting flange is secured to said stud face surface and operative to provide additional resistance to movement of said front wall.

8. An integrally-formed electrical outlet box mounting bracket for supporting at least one size electrical outlet box on a wall or ceiling stud having perpendicularly oriented face and side surfaces, comprising:

(a) a substantially planar front wall occupying a first plane and adapted to have at least one corner of an outlet box releasably attached thereto;

(b) a substantially planar connecting wall occupying a second plane perpendicular to said first plane and integrally connected to said front wall along a first edge of said connecting wall;

(c) a substantially planar mounting flange occupying a third plane offset outwardly from and substantially parallel to said first plane and integrally connected to said connecting wall along a second edge thereof located opposite said first edge, said mounting flange being adapted for being secured to the face surface of a stud so that said first and third planes resides in planes substantially parallel to said face surface of said stud and an inner surface of said connecting wall is caused to contact and rest snugly against a side surface of the stud; and (d) stiffening means including at least one stiffening member integrally formed as part of said bracket, extending inwardly from said front wall and having a surface coplanar with said connecting wall inner surface which contacts and rests against the same side surface of the stud against which said connecting wall rests when said mounting flange is secured to said stud and operative to resist movement of said front wall.

9. An electrical outlet box mounting bracket as claimed in claim 8 in which said connecting wall comprises a step formed as a planar rectangular portion of said bracket and in which said first edge is substantially parallel to said second edge.

10. An electrical outlet box mounting bracket as claimed in claim 9 further comprising a planar box stop located in a plane parallel to said second plane and fixedly attached to said front wall and located so as to contact an outer surface of said outlet box when said box is mounted immediately behind said front wall.

11. An electrical outlet box mounting bracket as claimed in claim 9 further comprising a planar box hook located in a plane parallel to said second plane and attached to said front wall so as to contact an inner surface of said outlet box when said box is mounted immediately behind said front wall.

12. An electrical outlet box mounting bracket as claimed in claim 9 in which said stiffening member comprises at least one planar buttress oriented in a plane substantially perpendicular to both said first and second planes.

13. An electrical outlet box mounting bracket as claimed in claim 12 in which said front wall includes at least one stiffening lip located in a plane perpendicular to the plane of said front wall.

14. An electrical outlet box mounting bracket as claimed in claim 8 in which said front wall includes at least one stiffening lip located in a plane perpendicular to the plane of said front wall.

15. An electrical outlet box mounting bracket as claimed in claim 8 in which said stiffening member includes a planar flange adapted to contact and rest against the same stud side surface against which said connecting wall inner surface and said stiffening member surface rests when said mounting flange is secured to said stud face surface and operative to provide additional resistance to movement of said front wall.

* * * * *